(12) United States Patent
Kaneko et al.

(10) Patent No.: US 6,513,933 B1
(45) Date of Patent: Feb. 4, 2003

(54) PROJECTOR AND DISPLAY SYSTEM

(75) Inventors: Hiroki Kaneko, Tokyo (JP); Tetsuya Ooshima, Tokyo (JP); Yoshiyuki Kaneko, Hachioji (JP); Akira Arimoto, Fuchu (JP); Osamu Ebina, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 09/658,485

(22) Filed: Sep. 8, 2000

(30) Foreign Application Priority Data

Sep. 10, 1999 (JP) .......................................... 11-256720

(51) Int. Cl.[7] .......................... G03B 21/00; G03B 21/26; G03B 21/14; G03B 35/08; H04N 15/00
(52) U.S. Cl. ............................. 353/10; 353/7; 353/102; 353/30; 353/31; 353/37; 353/97; 348/42; 352/57; 352/60
(58) Field of Search ............................ 353/7, 97, 10, 353/100, 101, 30, 31, 37, 34, 122, 102; 349/5, 7; 352/57, 60; 348/42

(56) References Cited

U.S. PATENT DOCUMENTS

| | | | | |
|---|---|---|---|---|
| 5,398,125 A | * | 3/1995 | Willett et al. | 359/41 |
| 5,467,206 A | * | 11/1995 | Loiseaux et al. | 359/40 |
| 5,703,717 A | * | 12/1997 | Ezra et al. | 359/462 |
| 5,853,240 A | * | 12/1998 | Tanaka et al. | 353/20 |
| 5,954,424 A | * | 9/1999 | Anderson et al. | 362/242 |
| 6,151,062 A | * | 11/2000 | Inoguchi et al. | 348/51 |
| 6,163,349 A | * | 12/2000 | Nakanishi et al. | 349/5 |
| 6,323,999 B1 | * | 11/2001 | Ueda et al. | 359/443 |

FOREIGN PATENT DOCUMENTS

JP  10-186522  7/1998 ........... G03B/21/60

OTHER PUBLICATIONS

Edward H. Stupp and Matthew S. Brennesholtz, "Projection Displays" copyright 1999, John Wiley and Sons Ltd. ISBN 0471982539, pp. 258–260.*

"Three–Dimensional Image Engineering", T. Oukoshi, Asakura Bookstore Press, pp. 91–97.

* cited by examiner

Primary Examiner—Russell Adams
Assistant Examiner—Melissa J. Koval
(74) Attorney, Agent, or Firm—Antonelli, Terry, Stout & Kraus, LLP

(57) ABSTRACT

An image projector, having a light source, an LCD panel into which a light emitted from the light source enters, and a projection lens into which the light emitted from the LCD panel enters. There exists, in an entrance pupil of the projection lens, a range in which light emitted from respective pixels of the LCD panel overlap with each other at least in a horizontal direction. The image projector forms part of an image display.

16 Claims, 5 Drawing Sheets

PROJECTOR AND DISPLAY SYSTEM

BACKGROUND OF THE INVENTION

1. Field of the Invention

The present invention relates to an image projector and an image display that includes the image projector and a directional reflection screen.

2. Description of the Related Art

Conventionally, as the image display formed by combining the directional reflection screen with the image projector, there have been known apparatuses such as a 3-dimensional display using the principle of binocular parallax. The fundamental principle of the directional reflection screen that uses a corner reflective-mirror group as a light-converging method in the horizontal direction has been disclosed on, for example, page 28 and pp. 91–97 in Takayoshi Oukoshi, "Three Dimensional Image Engineering", Asakura Bookstore Press.

FIG. 6 illustrates a directional reflection screen disclosed in JP-A-10-186522, which has been manufactured using the technology based on the above-described principle. Combining a 2-plane orthogonal corner reflective-mirror group 31 with a lenticular board 32 configures a screen 3. Incident light into the screen is converged and reflected in the horizontal direction by the 2-plane orthogonal corner reflective-mirror group 31, and the incident light is diffused and reflected in the vertical direction by the lenticular board 32.

FIG. 9 illustrates the state where, when an image is projected onto the above-described screen 3, the reflection of the light is seen from the above. Since the light reflected by the screen 3 is converged onto the positions of two image projectors 51, 52 in the horizontal direction, the two image projectors 51, 52 are located directly above or below a right eye and a left eye of a viewer 20, respectively. At the same time, a pair of image signals becoming a 3-dimensional image signal based on the principle of the binocular parallax is projected and irradiated onto the screen 3. This operation allows the viewer 20 to view the 3-dimensional image.

Here, although the above-described explanation is about the 3-dimensional image, a 2-dimensional image can be viewed when projecting identical image signals from the two image projectors 51, 52. Also, it is needless to say that, when using only one image projector, the 2-dimensional image can also be viewed.

SUMMARY OF THE INVENTION

As is obvious from the above-described prior art, a width in the horizontal direction of the light emitted from a projection lens in the image projector toward the screen is equal to a width in the horizontal direction where the viewer is able to view the image. Accordingly, if the image projector is downsized for implementing, for example, space-saving, the projection lens is also reduced in association therewith, thus narrowing the viewing area. In order not to narrow the viewing area, it is considered That the other optical systems in the image projector are downsized with only a size of the projection lens kept unchanged. In this consideration, however, the light is emitted from only a portion of range of the projection lens, resulting in no improvement in the viewing area.

It is an object of the present invention to provide an image projector and an image display where the viewing area in the horizontal direction is extended.

In order to solve the above-described problem, it is preferable and appropriate to extend lights in an entrance pupil of the projection lens in the image projector so that the lights are overlapped with each other at least in the horizontal direction, the lights having passed through or reflected from the respective positions on the LCD panel.

Here, the phrase "the respective positions on the LCD panel" means the respective pixels of the LCD panel. The phrase "having passed through or reflected from" means that the LCD panel is of "a transmittance type or a reflection type". The phrase "are overlapped with each other in the horizontal direction" means that, when the extended states of the lights into the horizontal direction are compared with each other in the entrance pupil of the projection lens, the lights attaining from the respective pixels exist in a certain range in the horizontal direction, the lights having passed through or reflected from the respective positions on the LCD panel. The phrase "are overlapped with each other at least in the horizontal direction" means that the lights existing in this range include states of being located apart from each other in the vertical direction. The lights, of course, include states of being overlapped with each other not only in the horizontal direction but also in the vertical direction. The phrases "the horizontal direction and the vertical direction" correspond to "the horizontal direction and the vertical direction" used usually in the directional reflection screen illustrated in FIG. 6. In the directional reflection screen, a direction obtained by connecting the both eyes of the viewer is "the horizontal direction".

When the lights in these states are emitted from 15 the image projector and enter the directional reflection screen, even in the case of the lights existing in the states of being located apart from each other in the vertical direction, the lights that have been reflected by the directional reflection screen and have returned back to an exit pupil of the projection lens are overlapped with each other in the vertical direction. This is attributed to the fact that the directional reflection screen has the function of diffusing and reflecting the incident light in the vertical direction. Also, the lights that have returned back to the exit pupil, in the horizontal direction, are overlapped with each other in a range that is equal to the range at the time of the emission from the exit pupil. Consequently, the exit pupil is located directly above or below the viewer, thereby allowing the viewer to view an image without being chipped.

As having been described so far, in summary, the image projector in the present invention is characterized by including a light source, the LCD panel that the lights emitted from the light source enter, and the projection lens that the lights emitted from the LCD panel enter, wherein there exists, in the entrance pupil of the projection lens, a range in which the lights emitted from the respective pixels of the LCD panel are overlapped with each other at least in the horizontal direction. The LCD panel may be of either the transmittance type or the reflection type.

Also, the image display in the present invention is characterized by being formed by locating the image projector and the directional reflection screen in such a manner as to be in parallel to the horizontal direction.

The present invention permits a conventionally chipped image to be viewed in a state of being not chipped. In addition to this, the present invention makes it possible to extend further the viewing area in the state.

DESCRIPTION OF THE EMBODIMENTS

Hereinafter, using the embodiments, the explanation will be given concerning the details of the present invention. The image projector is defined as an apparatus (projector) that includes at least a light source, a LCD panel, and a projection lens. Also, the image display is defined as an apparatus that includes the image projector and a directional reflection screen.

Embodiment 1

Figure 1:
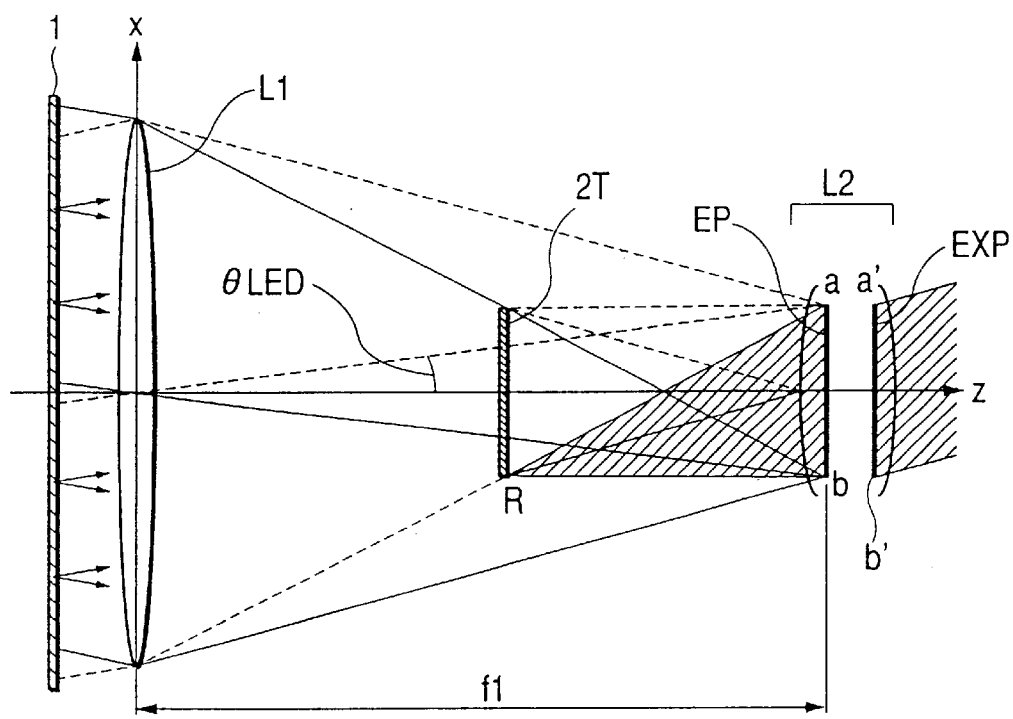
FIG. 1 is a horizontal direction cross-sectional view of an optical system of an image projector in an embodiment according to the present invention.
Figure 7:
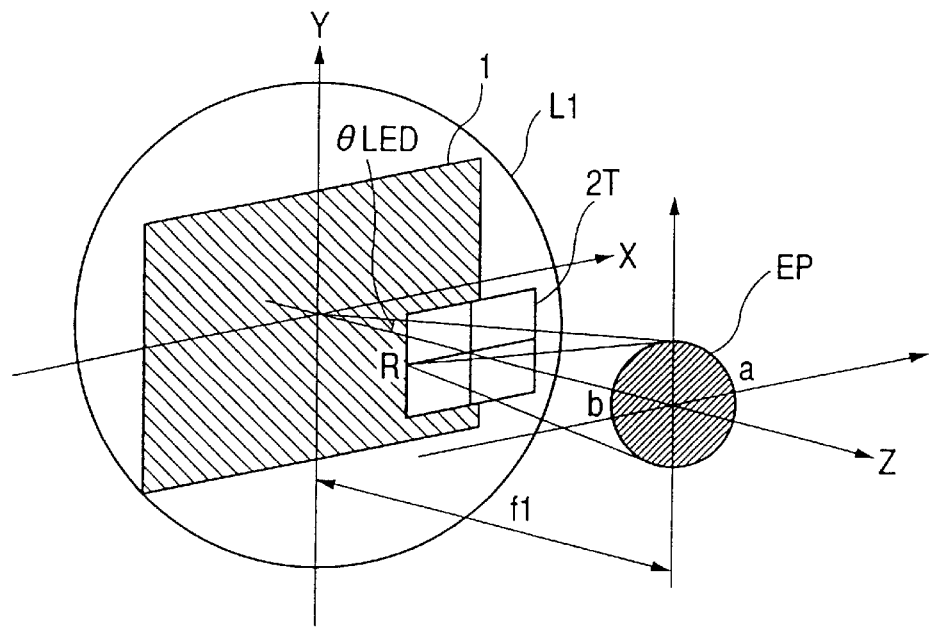
FIG. 7 is a perspective view of the optical system of the image display in the embodiment according to the present invention.

FIG. 7 illustrates a perspective view of an optical system of an image projector in an image display of the Embodiment 1 according to the present invention. FIG. 1 illustrates a cross-sectional view of FIG. 7 in an x z plane. The image projector includes LED light sources 1 arranged in an array-like form, an illuminating lens L1, a transmittance type LCD panel 2T, and a projection lens L2. In the present embodiment, the light source includes a light emitting unit, i.e., the LED light sources 1, and the illuminating lens L1.

The LED light sources 1 have a diffusion angle $\theta_{LED}$ toward an optical axis (i.e., z axis). The lens L1, which has a focal length f1, is located so that the distance between the lens L1 and an entrance pupil EP of the projection lens L2 becomes equal to the focal length f1. An area of the lens L1, i.e., an exit plane of the light sources, is larger than an area of the LCD panel 2T. The lens L1 and the LCD panel 2T are located in such a manner that an angle that a line forms with the lens L1 becomes an acute angle, the line connecting a circumference of the lens L1 with a circumference of the LCD panel 2T. On account of this location, the lights emitted from the respective points of the LED array light sources 1 with the angle $\pm\theta_{LED}$ are converged onto positions a, b on the entrance pupil EP by the exertion of the lens L1. At this time, a light passing through a position R (a light having image information on the position R) on the LCD panel 2T, as indicated by the sloped line portion in FIG. 7, has been extended over between the positions a, b on the entrance pupil EP. Namely, there exists, in the entrance pupil, a lights-overlapped range a b in the horizontal direction.

Figure 2:
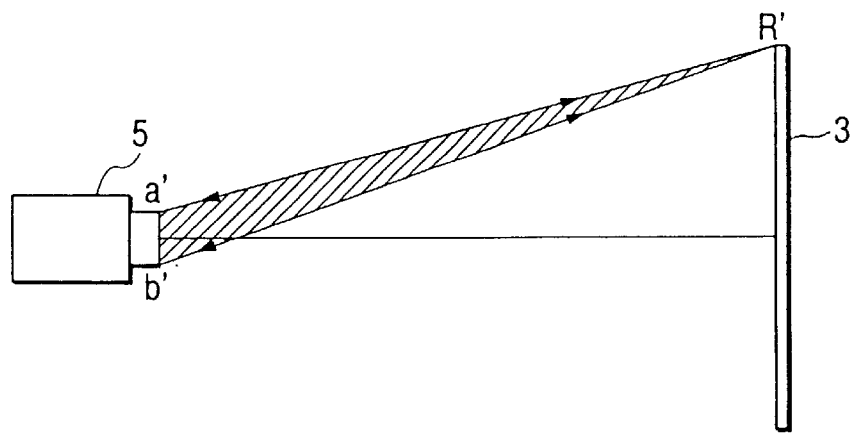
FIG. 2 is a top view of the image display in the embodiment according to the present invention.

As illustrated in FIG. 2, this light is emitted from portions of a width a', b' on an exit pupil EXP of the projection lens L2, then being converged onto a position R' on the directional reflection screen 3. Here, the light distribution on the exit pupil EXP is in a corresponding relationship with that on the entrance pupil EP. The directional reflection screen 3, regarding the horizontal direction, has the function of reflecting a light into the incident direction. On account of this, the light that has entered the position R' is reflected and extended again over between the positions a', b' on the exit pupil EXP. The above-described steps up to this are also the same concerning the positions other than the position R on the transmittance type LCD panel 2T. As a result, all the image information on the transmittance type LCD panel 2T exists between the positions a', b' on the exit pupil EXP. The directional reflection screen 3, regarding the vertical direction, has the function of diffusing and reflecting an incident light. Consequently, if a viewer (not illustrated) looks at the screen 3 with his or her eyes positioned directly above or below between the positions a', b' on the surface of the exit pupil EXP, the viewer is able to view the image within the range. Considering the fact that a size of a human's pupil is about 10 mm, in order to provide an image that the viewer finds it easy to see, it is preferable that there exists 10 mm or longer lights-overlapped range a' b' on the surface of the exit pupil EXP. It is preferable that there also exists the 10 mm or longer lights-overlapped range a b on the surface of the entrance pupil EP.

Also, considering the utilization efficiency of the lights, it is ideal that, as illustrated in FIG. 1, the lights-overlapped range a b is of the same length as that of the diameter of the entrance pupil EP, namely, the relationship given by the following formula 1 holds:

[Formula 1]

$$a\ b = 2(f1)\tan(\theta_{LED}) \tag{1}$$

Here, even if the range a b is longer than the diameter of the entrance pupil EP, it is possible to obtain the viewing area that is substantially the same as that in the ideal case although the light loss is increased. However, if the range a b is shorter than the diameter of the entrance pupil EP, the viewing area becomes narrower than that in the ideal case although there occurs no light loss.

The above-described explanation has been given regarding the case where the transmittance lights from the respective pixels of the LCD panel have been extended over the entire surface of the entrance pupil EP.

Figure 8:
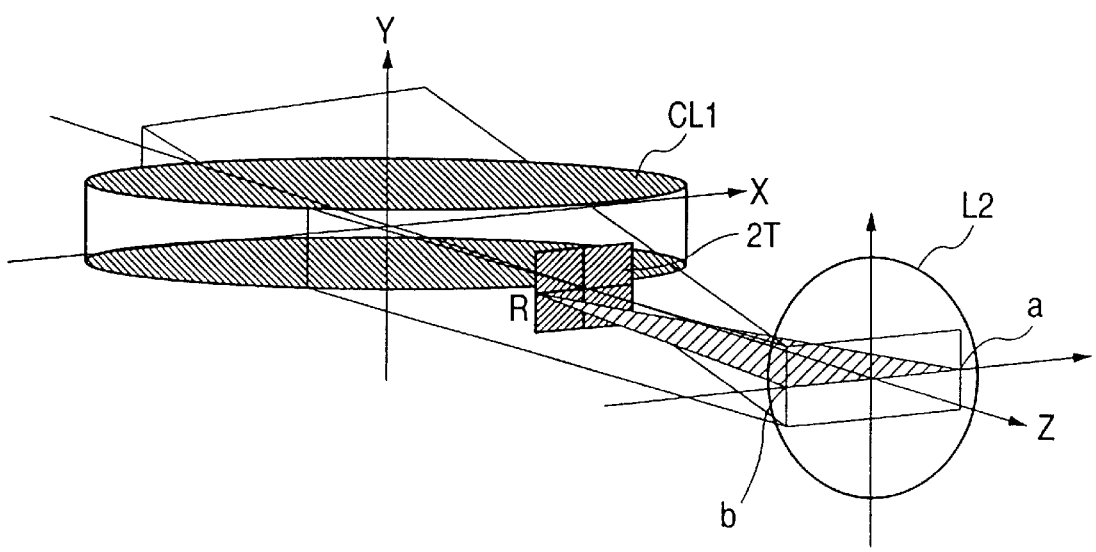
FIG. 8 is a perspective view of an optical system of an image display in an embodiment according to the present invention.
Figure 9:
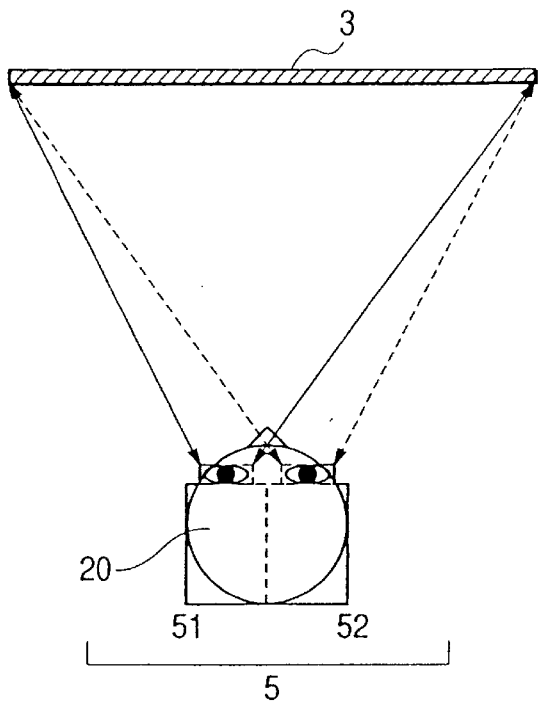
FIG. 9 is a top view of the image display according to the prior art.

Meanwhile, as illustrated in FIG. 8, the present invention can also be implemented in the following case: A cylinder lens CL1 exhibiting a lens effect only in the horizontal direction is used as the illuminating lens, and the light having passed through the position R on the transmittance type LCD panel 2T is extended over only in the horizontal direction. Considering the utilization efficiency of the light in this case, the occasion is ideal where the light is diffused only in the horizontal direction with the angle $\theta_{LED}$ and is not diffused in the vertical direction. The present invention, however, can be implemented even if there exists a diffused component in the vertical direction.

Also, from an optical point of view, the case where the reflection type LCD panel is used can be regarded as being equivalent to the case where the transmittance type LCD panel is used. In this case, however, it is required to use a half mirror (HM) as is indicated in a cross-sectional view of an image projector illustrated in FIG. 4.

Figure 4:
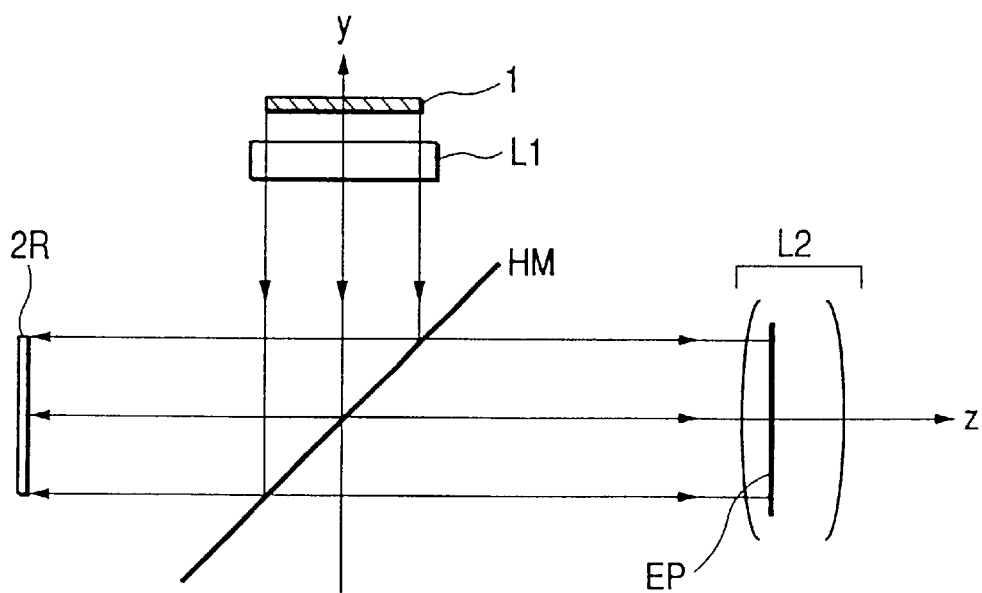
FIG. 4 is a vertical direction cross-sectional view of an optical system of an image projector in an embodiment according to the present invention.

Hereinafter, in the image projector where the light source includes the cylinder lens CL1 and the light emitting unit, i.e., the LED array light sources 1, the explanation will be given concerning the way in which lights travel in the vertical direction (a y-axis direction). The cylinder lens CL1 is located so that it converges or diverges lights perpendicular to the surface of the page on which FIG. 4 is illustrated, namely, it exhibits the lens effect in an x-axis direction. Also, the half mirror HM is located so that it reflects a light entering in the vertical direction (the y-axis direction) into the horizontal direction (a z-axis direction), and thus the half mirror HM exerts no influence onto the vertical direction.

On account of this, a light emitted from the LED array light sources 1 located above is reflected into the z-axis direction by the half mirror HM, then entering the reflection type LCD panel 2R. The light reflected by the reflection type LCD panel 2R passes through the half mirror HM, then being guided into the projection lens L2. It is needless to say that a beam splitter may be used instead of the half mirror.

In the present embodiment, the following numerical values have been employed: $\theta_{LED}=\pm 7.$, f1=40.7 mm, a horizontal direction size of LCD 2R=7.6 mm, the horizontal-direction lights-overlapped range a b on the entrance pupil= 10 mm, and, a size of the LED array light sources=32.8 mm×27.3 mm or 32.8 mm×7.6 mm.

Embodiment 2

Figure 3:
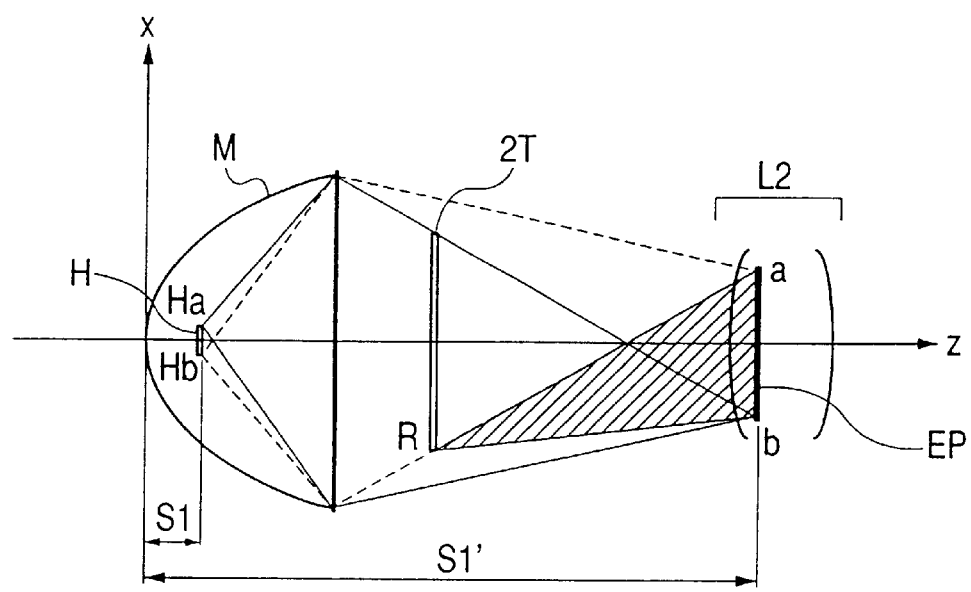
FIG. 3 is a horizontal direction cross-sectional view of an optical system of an image projector in an embodiment according to the present invention.

FIG. 3 illustrates a horizontal direction cross-sectional view of an image projector in the Embodiment 2 according to the present invention. A halogen lamp is used as the light source. Moreover, an illuminating ellipse mirror M forms an image of a filament H of the halogen lamp on the surface of the entrance pupil EP of the projection lens L2. Namely, the following formula 2 is satisfied:

[Formula 2]

$$1/f1=(1/s1)+(1/s1')\qquad(2)$$

Images of all the lights emitted from Ha on the filament H and then reflected by the ellipse mirror M are formed onto b on the surface of the entrance pupil EP. Similarly, images of all the lights emitted from Hb and then reflected by the ellipse mirror M are formed onto a. At this time, the light passing through the position R (the light having the image information on the position R) on the transmittance type LCD panel 2T, as indicated by the sloped line portion in FIG. 3, has been extended over between the positions a, b on the entrance pupil EP. Namely, there exists the horizontal-direction lights-overlapped range a b on the entrance pupil. Concerning the way in which the lights will travel thereinafter, the viewing area and the utilization efficiency of the lights, they are substantially the same as those in the Embodiment 1.

Although the halogen lamp has been used as the light source in the present embodiment, the light source is not limited thereto. For example, a metal halide lamp is also usable as the light source. Also, it is needless to say that the present embodiment is not only applicable to the case where the image of the filament H is formed on the entrance pupil EP by the ellipse mirror M but also applicable to the case where the image is formed by an illuminating lens.

In the present embodiment, the following numerical values have been employed: H=1.6 mm, f1=7.6 mm, s1=8.3 mm, and, s1'=94.9 mm.

Embodiment 3

Figure 5:
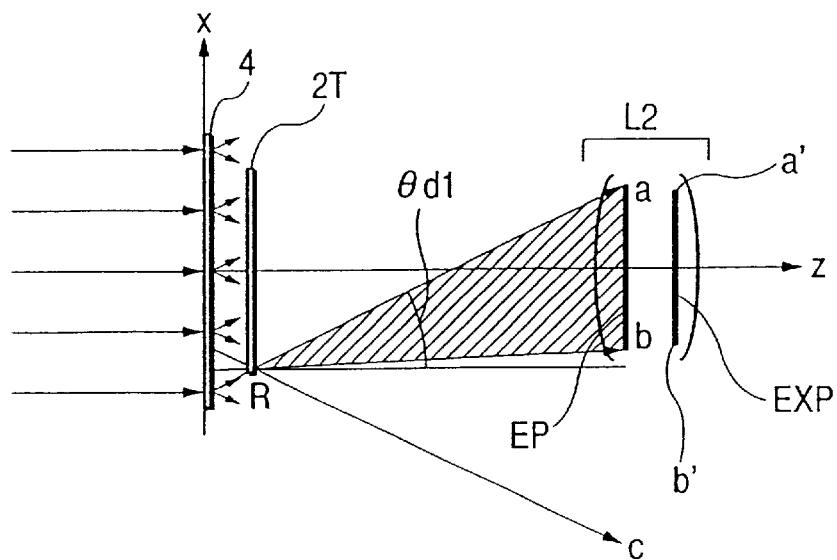
FIG. 5 is a horizontal direction cross-sectional view of an image projector in an embodiment according to the present invention.
Figure 6:
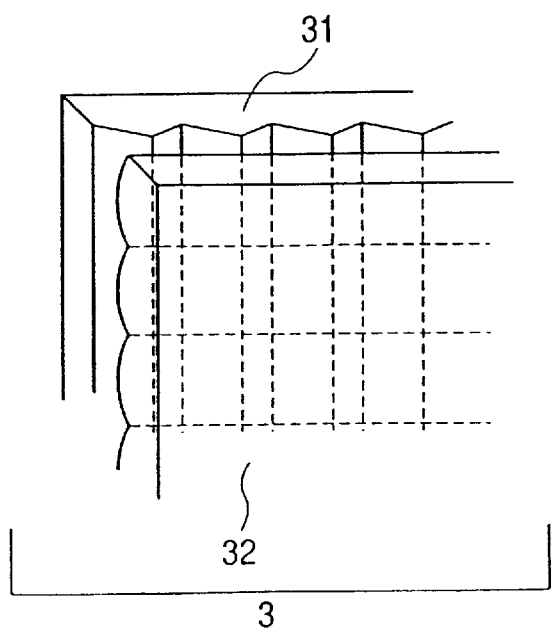
FIG. 6 is a perspective view for illustrating the structure of the directional reflection screen.

FIG. 5 is a top view of an image projector in the Embodiment 3 according to the present invention, the image projector having a diffuser 4 as a diffusing member. When parallel lights enter the diffuser 4, the lights are 10 diffused at the respective positions of the diffuser 4. (The diffusion angle of the diffuser at this time is assumed to be $\theta_{d1}$.) Here, paying attention to the light passing through the position R on the transmittance type LCD panel 2T, the light has been extended over in a range a, c that includes and is wider than the horizontal-direction lights-overlapped range a b on the entrance pupil. Similarly, the lights passing through the other positions on the transmittance type LCD panel 2T have been extended over in ranges that include and are wider than the range a b. In general, a light having entered the range a b on the entrance pupil EP is emitted from the range a' b' on the exit pupil EXP. Consequently, with the help of the functions of the directional reflection screen described earlier, it becomes possible to view an image in the range a', b'.

Figure 10:
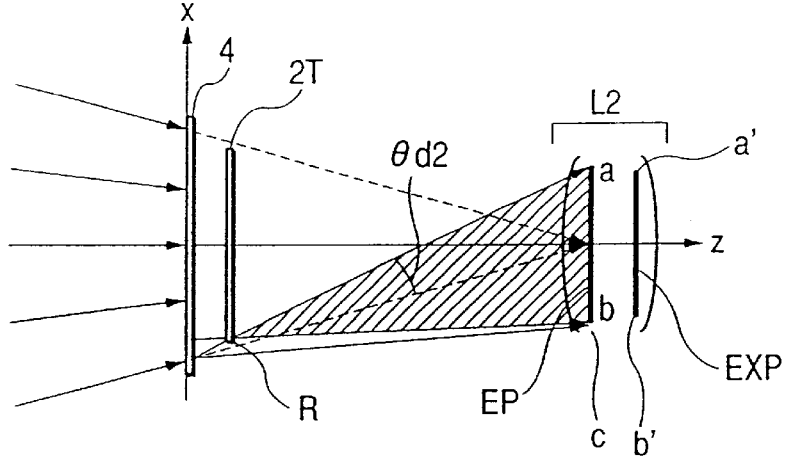
FIG. 10 is a horizontal direction cross-sectional view of the optical system of the image projector in the embodiment according to the present invention.

Also, when the incident lights into the diffuser 4 are not parallel lights, the implementation is possible by locating the diffuser so that all of the lights having passed through the transmittance type LCD panel 2T are similarly extended over in the ranges that include and are wider than the range a b. For example, as illustrated in FIG. 10, if the lights that are going to converge into the center of the entrance pupil EP enter the diffuser 4, the diffusion angle $\theta_{d2}$ of the diffuser 4 is allowed to be smaller than the above-described diffusion angle $\theta_{d1}$. This also results in a higher utilization efficiency of the lights.

Furthermore, implementing the diffuser 4 is also possible with the use of such diffusers as the one that diffuses a light in the horizontal direction strongly (i.e., a holographic device).

Although the above-described explanation concerning the present embodiment has been the one based on the transmittance type LCD panel, the present embodiment is also applicable to the reflection type LCD panel. In an optical system using the reflection type LCD panel, an incident light into the panel and the light reflected therefrom pass through the same optical path with each other. Accordingly, in order not to deteriorate the image information that the light reflected from the reflection type LCD panel has, it is required to bring the diffuser into close contact with the reflection type LCD panel. The same effect is also obtainable using a micro lens array as the diffusing member in the present embodiment.

Embodiment 4

Figure 11:
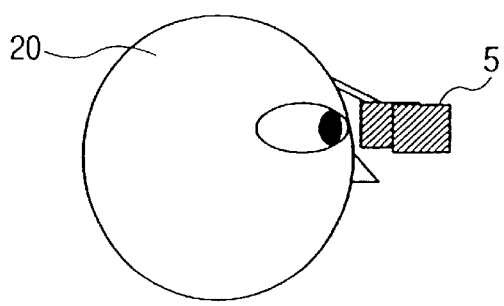
FIG. 11 is a side view of an embodiment of the image display according to the present invention.

The above-described embodiments have been the ones concerning the image display including the image projector and the directional reflection screen. Meanwhile, as illustrated in FIG. 11, the present embodiment is also usable in the case where the LCD panel within the image projector 5 is directly viewed (i.e., for the wearable case). Even in this type of embodiment, the present invention makes it possible to extend the viewing area.

The present invention permits a conventionally chipped image to be viewed in a state of being not chipped. In addition to this, the present invention makes it possible to extend even further the viewing area in the state.

What is claimed is:

1. An image projector, comprising:
    a light source,
    an LCD panel into which a light emitted from said light source enters, and
    a projection lens into which said light emitted from said LCD panel enters, wherein there exists, in an entrance pupil of said projection lens, a range in which light emitted from respective pixels of said LCD panel overlap with each other at least in a horizontal direction.

2. The image projector as claimed in claim 1, wherein said range in which said light from respective pixels overlap in said horizontal direction is at least 10 mm.

3. An image display, comprising:

said image projector as claimed in claim 2, and a directional reflection screen for reflecting a light emitted from said image projector, wherein said image projector and said directional reflection screen are located in such a manner as to be in parallel to said horizontal direction.

4. The image projector as claimed in claim 1, wherein said light source includes a cylinder lens on a side of said LCD panel with respect to said light source.

5. An image display, comprising:

said image projector as claimed in claim 4, and a directional reflection screen for reflecting a light emitted from said image projector, wherein said image projector and said directional reflection screen are located in such a manner as to be in parallel to said horizontal direction.

6. The image projector as claimed in claim 1, wherein said light source includes an LED array light source.

7. An image display, comprising:

said image projector as claimed in claim 6, and a directional reflection screen for reflecting a light emitted from said image projector, wherein said image projector and said directional reflection screen are located in such a manner as to be in parallel to said horizontal direction.

8. The image projector as claimed in claim 1, wherein said light source includes diffusing means on a side of said LCD panel with respect to said light source.

9. The image projector as claimed in claim 8, wherein said diffusing means is a micro lens.

10. An image display, comprising:

said image projector as claimed in claim 8, and a directional reflection screen for reflecting a light emitted from said image projector, wherein said image projector and said directional reflection screen are located in such a manner as to be in parallel to said horizontal direction.

11. An image display, comprising:

said image projector as claimed in claim 9, and a directional reflection screen for reflecting a light emitted from said image projector, wherein said image projector and said directional reflection screen are located in such a manner as to be in parallel to said horizontal direction.

12. The image projector as claimed in claim 1, wherein said LCD panel is a reflection type LCD panel, said image projector further comprising a half mirror or a beam splitter, said half mirror or said beam splitter reflecting said light emitted from said light source so as to cause said light to enter said reflection type LCD panel and permitting said light reflected by said reflection type LCD panel to pass through so as to cause said light to enter said projection lens.

13. An image display, comprising:

said image projector as claimed in claim 12, and a directional reflection screen for reflecting a light emitted from said image projector, wherein said image projector and said directional reflection screen are located in such a manner as to be in parallel to said horizontal direction.

14. An image display, comprising:

said image projector as claimed in claim 1, and a directional reflection screen for reflecting a light emitted from said image projector, wherein said image projector and said directional reflection screen are located in such a manner as to be in parallel to said horizontal direction.

15. The image display as claimed in claim 14, wherein there are provided two of said image projectors.

16. The image projector as claimed in claim 1, wherein said light from respective pixels completely overlap in said range of the entrance pupil of said projection lens.

\* \* \* \* \*